2,790,829

United States Patent Office

Patented Apr. 30, 1957

2,790,829
AMYL-GLYCINE-ANILIDES

Nils Magnus Löfgren, Lidingo, and Bengt Josef Lundqvist, Stockholm, Sweden, assignors to Aktiebolaget Astra, Apotekarnes Kemiska Fabriker, Sodertalje, Sweden, a company of Sweden No Drawing. Application July 17, 1953,
Serial No. 368,814

Claims priority, application Sweden July 18, 1952

5 Claims. (Cl. 260—562)

The present invention relates to local anesthetics of the type alkyl glycinanilides. It has been found that many compounds of this type, though having local anesthetic properties, cannot be used clinically as they are toxic in one or the other way, such as tissue-irritating.

It is therefore the object of this invention to provide non-toxic, clinically useful local anesthetics.

The local anesthetics according to the invention satisfy the general formula

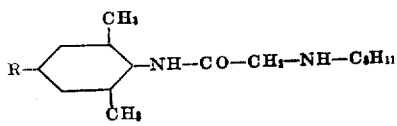

in which R is selected from the group comprising H and $CH_3$, and the group —$C_5H_{11}$ is selected from normal amyl and isoamyl. The invention thus comprises monoamylamino-acetyl-2,6-xylidide and monoamylamino-acetyl-mesidide, wherein the amyl group is either normal or isoamyl.

The preferred method of manufacturing the local anesthetics referred to consists in reacting an acetic acid derivative of the general formula X—CO—$CH_2$—Y in which X represents an atom or monovalent radical capable of reacting with one H of the amino group of an aniline compound, and Y represents an atom or monovalent radical capable of reacting with one H of the amino group of a primary amyl amine; successively in arbitrary order with a methylated aniline of the general formula

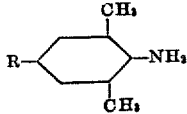

in which R is selected from the group comprising H and $CH_3$, and a monoamyl amine to form a monoamylaminoacetyl-anilide of the general formula

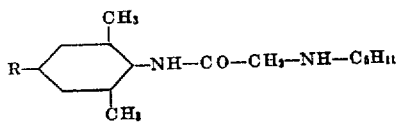

in which each of R and the group —$C_5H_{11}$ respectively has the significance indicated above. In this method each of the atoms or monovalent radicals X and Y represents preferably a halogen atom of the group comprising Cl, Br, and I. Usually, chlorine is to be preferred. X and Y may represent different halogens.

The acetic acid derivative is preferably first reacted with the above mentioned methylated aniline and the reaction product is then reacted with the amyl amine to form the corresponding monoamylamino-acetyl-anilide.

The amyl group may be normal amyl or isoamyl, for instance —$CH_2.CH_2.CH.(CH_3)_2$.

The invention is illustrated by reference to the following examples, but it is to be understood that it is not limited thereto.

Example 1.—Isoamylamino-aceto-xylidide 1 mol of chloro-aceto-xylidide, 4 mols of isoamyl amine and 550 milliliters water-free xylene were heated in a flask to 100° C. for 5 hours. After cooling, the solution was diluted with an equal volume of absolute ether whereby isoamyl-amino-hydrochloride precipitated and was then filtered off. From the filtrate, the base isoamylamine-aceto-xylidide was extracted by repeated shakings with phosphoric acid. The phosphoric acid extracts were combined and made alkaline by the addition of concentrated ammonia, whereafter the base was extracted with ether. The ether solution was dried with $Na_2SO_4$ and the ether was evaporated off. The residue, a yellow-coloured oil, which soon solidified, was recrystallized from n-dibutyl ether. M. P. 44–45° C. Yield 83%. M. P. of the hydrochloride 211–213° C.

Example 2.—Isoamylamino-aceto-mesidide 1 mol of chloro-aceto-mesidide, 4 mols of isoamyl amine and 550 milliliters water-free xylene were heated to 100° C. for 5 hours in a flask provided with reflux condenser. After cooling, the solution was diluted with an equal volume of absolute ether whereby isoamyl-amino-hydrochloride precipitated. The precipitate was filtered off and the filtrate was repeatedly extracted with acetic acid. The acetic acid extracts were combined and the base isoamylamino-aceto-mesidide was liberated by the addition of concentrated ammonia. The base was extracted with ether and the ether solution was dried with $Na_2SO_4$. The ether was then evaporated off, first at pressure and then at 10 millimeters of mercury and a temperature of 100° C. The residue, a yellow-coloured oil, crystallized on cooling. By recrystallization from n-dibutyl ether crystals of M. P. 61–62° C. were obtained. Yield 87%. M. P. of the hydrochloride 236–238° C.

Example 3.—n-Amylamino-aceto-xylidide 1 mol of chloro-aceto-xylidide, 4 mols of n-amyl amine and 550 milliliters of water-free xylene were heated in a flask to 100° C. for 5 hours. The solvent and the excess of amyl amine were then evaporated off, first at normal atmospheric pressure and thereafter at 10 Torr. The residue was boiled repeatedly with normal hydrochloric acid, from which the hydrochloride of the desired base precipitated on cooling. The precipitated hydrochloride was filtered and dried. Yield 70%. M. P. 211–213° C.

The base n-amylamino-aceto-xylidide was liberated from the hydrochloride by the addition of concentrated ammonia, and was then extracted with ether. The ether solution was then dried. After evaporation of the solvent, a colourless oil was obtained which solidified in the form of crystals. M. P. 43–45° C.

Example 4.—n-Amylamino-aceto-mesidide 1 mol of chloro-aceto-mesidide, 4 mols of n-amyl amine and 550 milliliters of water-free xylene were heated in a flask to 100° C. for 5 hours. The solvent and excess of amyl amine were then evaporated off. The residue was boiled with normal hydrochloric acid. On cooling, the hydrochloride of the desired base precipitated. It was collected on a glass filter and dried. M. P. 198–199° C. Yield 58%. The base was liberated from the hydrochloride by the addition of concentrated ammonia. M. P. 68–69° C.

What is claimed is:

1. A non-toxic, clinically useful local anesthetic of the general formula

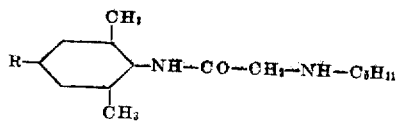

in which R is selected from the group consisting of H and CH$_3$, and the radical —C$_5$H$_{11}$ is a member of the class consisting of normal amyl and isoamyl.

2. (Mono)isoamylaminoacetyl 2,6-dimethylanilide.
3. (Mono)isoamylaminoacetyl 2,4,6-trimethylanilide.
4. (Mono - normal)amylaminoacetyl 2,6 - dimethylanilide.
5. (Mono - normal)amylaminoacetyl 2,4,6 - trimethylanilide.

References Cited in the file of this patent
UNITED STATES PATENTS 2,441,498  Lofgren et al. _____ May 11, 1948

OTHER REFERENCES

Lofgren et al.: "Svensk. Kem. Tid.," vol. 58 (1946), pp. 220, 224 and 225.

UNITED STATES PATENT OFFICE

CERTIFICATE OF CORRECTION

Patent No. 2,790,829                                                                 April 30, 1957

Nils Magnus Löfgren et al.

It is hereby certified that error appears in the printed specification of the above numbered patent requiring correction and that the said Letters Patent should read as corrected below.

Column 2, line 38, before "pressure" insert -- atmospheric --.

Signed and sealed this 13th day of August 1957.

(SEAL)
Attest:
KARL H. AXLINE
Attesting Officer

ROBERT C. WATSON
Commissioner of Patents